United States Patent [19]

Wang

[11] Patent Number: 5,024,021

[45] Date of Patent: Jun. 18, 1991

[54] LAMPSHADE-SHAPED ANIMAL TRAP

[76] Inventor: Chin-Teh Wang, P.O. Box 10160, Taipei, Taiwan

[21] Appl. No.: 503,912

[22] Filed: Apr. 4, 1990

[51] Int. Cl.$^5$ .............................................. A01M 23/02
[52] U.S. Cl. .......................................................... 43/62
[58] Field of Search .................................. 43/62, 68, 78

[56] References Cited

U.S. PATENT DOCUMENTS

| | | | |
|---|---|---|---|
| 67,893 | 8/1867 | Mansfield | 43/62 |
| 79,686 | 7/1868 | Rain | 43/62 |
| 85,199 | 12/1868 | Beach | 43/62 |
| 778,675 | 12/1904 | Kerns | 43/62 |
| 821,913 | 5/1906 | Wilson | 43/62 |
| 1,088,477 | 2/1914 | De St. Legier | 43/62 |
| 2,682,130 | 6/1954 | Schumann | 43/62 |
| 2,707,844 | 5/1955 | Ciolli | 43/62 |
| 3,008,261 | 11/1961 | Long | 43/62 |

Primary Examiner—Kurt Rowan

[57] ABSTRACT

An animal trap includes a transparent lampshade-shaped cup slidably held on a vertical supporting pipe standing on a base plate, which cup is normally hanged on an upper portion of the supporting pipe by a biasing lever pivotally secured on a pair of fixed levers as locked by a horizontal bar secured with a bait rope having a bait mounted on a lower end of the rope, whereby upon a taking of the bait by an animal, the horizontal bar as clamped between the fixed levers and the biasing lever will be released to unlock the biasing lever without hanging the cup, thereby dropping the cup for catching the animal.

5 Claims, 3 Drawing Sheets

LAMPSHADE-SHAPED ANIMAL TRAP

BACKGROUND OF THE INVENTION

A conventional mouse trap may be formed as a catching cage or may be provided with a spring-loaded metal bar that is released by the taking of the bait by a mouse, which however may have the following drawbacks:

1. If the trap is made as a cage like structure, it will scare away a mouse, especially a wise mouse, thereby losing its catching effect. Moreover, the bait as held in the cage is not easily viewed from an outside intruding mouse.

2. The spring-loaded trap, once catching a mouse, may resiliently clamp the caught mouse so seriously to even shred or break the mouse body, causing pollution problems due to bloody or shredded mouse body.

3. The traditional mouse trap is only served for catching mouse, not suitable for catching other animals, for instance, a fish in the water.

The present inventor has found the drawbacks of the conventional mouse trap and invented the present lampshade-shaped animal trap.

SUMMARY OF THE INVENTION

The object of the present invention is to provide an animal trap generally shaped like a lamp shade having a transparent catching cap which may reduce a cautionary mind of a watching animal to lure its taking of a bait hanged in the trap so as to easily catch an animal such as a mouse, a bird or even a fish.

DETAILED DESCRIPTION

Figure 1:
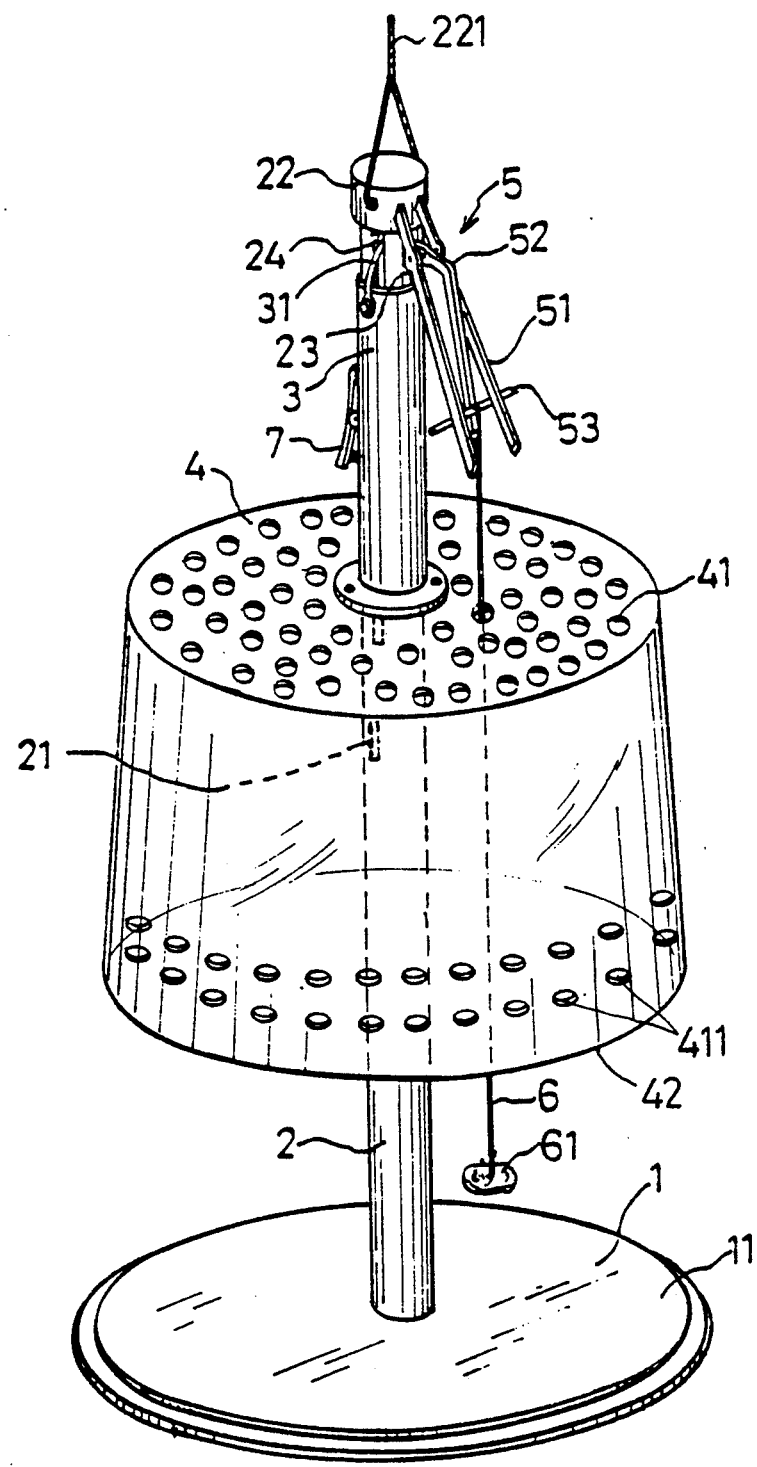
FIG. 1 is a perspective view of the present invention.

As shown in the figures, the present invention comprises: a vertical supporting pipe 2 having a base plate 1 formed on a bottom portion of the pipe 2; a catching cup 4 preferably made of transparent material secured to an outer pipe 3 movably jacketed on the supporting pipe 2; a trigger means 5 formed on an upper portion of the supporting pipe 2 for controlling the dropping of the cup 4; a bait rope 6 having its lower end portion mounted with a bait 61 thereon; and a spring catch 7 resiliently formed on an upper portion of the outer pipe 3.

Figure 3A:
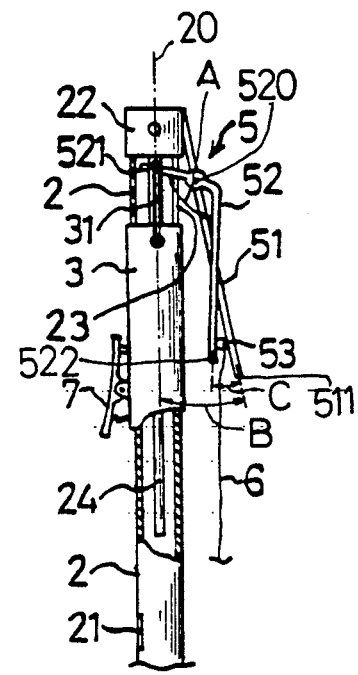
FIG. 3a–3e show the operating steps of the trap for catching an animal in accordance with the present invention.

The trigger means 5 includes: a pair of fixed levers 51 having their upper end portions secured on a cap 22 fixed on a top portion of the supporting pipe 2 and having their lower end portion 511 inclined downwardly outwardly from the cap 22 forming an acute angle B with a longitudinal axis 20 of the vertical supporting pipe 2, a biasing lever 52 generally formed as a bending lever having an obtuse angle A larger than 90 degrees between an upper rod portion 521 and a lower rod portion 522 pivotally mounted on an upper portion of said pair of fixed levers 51 by a fulcrum pin 520 formed between the two rod portions 521, 522 positioned at an upper portion of the fixed lever 51, and a horizontal bar 53 operatively clamped as shown in FIG. 3a between each lower portion 511 of the fixed lever 51 and a lower rod portion 522 of the biasing lever 52 having the bait rope 6 secured onto the horizontal bar 53 for a pendant holding of the rope 6 when mounted with bait 61 on the lower end of the rope 6.

The upper rod portion 521 of the biasing lever 52 is shorter in length than a length of the lower rod portion 522 and is protruded into a hollow portion of the supporting pipe 2 through an upper slot 23 formed in an upper portion of the pipe 2.

Figure 2:
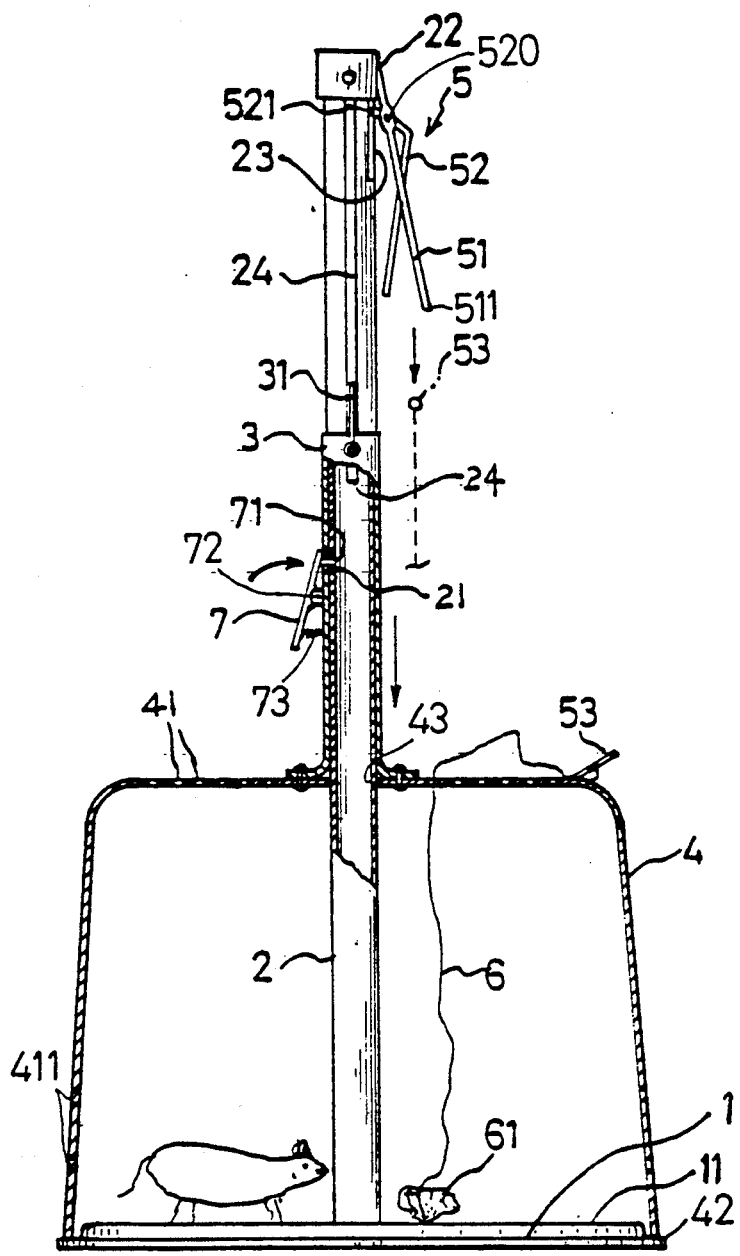
FIG. 2 is a partial sectional drawing when catching a mouse in the trap.

The outer pipe 3 has an inside diameter slightly larger than an outside diameter of the supporting pipe 2 so that the pipe 3 can be slidably movably reciprocated on the pipe 2. On an upper end portion of the pipe 3, there is provided with a U-shaped hanger 31 so that the pipe 3 as fixed with the cup 4 can be hanged on an upper rod portion 521 of the biasing lever 52 as shown in FIG. 3a ready for catching animal by poking the rod portion 521 into the U-shaped hanger 31. On the lowest portions of the U-shaped hanger 31, a short pin 32 is secured between the lowest portions so as to prevent unexpected vibration or rotation of the pipe 3 around the pipe 2. The length or height of the outer pipe 3 depends upon an expected inlet opening of the cup 4 above the base plate 1 as shown in FIG. 1. The U-shaped hanger 31 and pin 32 of the pipe 3 are operatively moved in a pair of longitudinal slots 24 symmetrically formed in an upper portion of the pipe 2 to be separated from the slot 23 as shown in FIG. 2. The pipe 3 has its bottom portion, which may be formed as a flange as shown in FIG. 1, secured with an upper portion of the cup 4.

The catching cup 4 may be generally formed as a lampshade shape and may be made of transparent material. On a top or upper portion of the cup 4, there is formed with a plurality of perforations 41 in the cup for easily passing air through the perforations 41 when dropping the cup 4 for catching an animal therein. On a lower periphery of the cup 4, there may also be formed with a plurality of perforations 411 annularly disposed around the cylindrical cup as shown in FIG. 1, especially useful in water for catching fish or the like. the lowest periphery 42 of the catching cup 4 may be engaged with a disk extension 11 formed on the base plate 1 as shown in FIGS. 2, 1. The base plate 1, and the disk extension 11 may be preferably shaped as a circular shape, whereas the cup 4 is preferably made as a cylindrical shape or a truncated cone shape as shown in the figures. A central top opening 43 is formed in a central portion of the cup 4 proximate to the lower portion or flange portion of the pipe 3, so that the cup 4 may also be slidably reciprocated on the pipe 2.

The spring catch 7 includes a middle portion 72 pivotally secured on the outer pipe 3, an upper latch 71 protruding inwardly through the pipe 3 and a tension spring 73 formed on a lower portion of the catch 7 urging the lower portion of the catch 7 outwardly so as to bias the latch 71 inwardly to always resiliently poke into a pipe wall of the outer pipe 3 and will be operatively engaged with a locking slot 21 formed in the supporting pipe 2 with respect to a "lower dead point" of the dropping cup 4 when catching an animal.

The catching cup 4 of the present invention may also serve as a device for catching fish in water, a rope 221 is secured to the top cap 22 so that a "fisher" can hold the rope 221 for storing the trap in a suitable location under water for catching fish.

In using the present invention for catching an animal as shown in FIG. 3a, the upper rod portion 521 of the biasing lever 52 is slightly raised to hold the U-shaped hanger 31 of the outer pipe 3 to thereby suspend the cup 4 on its upper location as shown in FIG. 1 ready for catching purpose. The gravitational force by the cup 4 and pipe 3 will bias the lower rod portion 522 outwardly as shown in an arrow direction of FIG. 3a, thereby clamping the horizontal bar 53 between the fixed levers 51 and the biasing lever 52, both levers 51, 52 defining an acute angle C as shown in FIG. 3a. The biasing moment (arrow direction) of the lever 52 as actuated by the gravitational force of cup 4 and pipe 3 will be obstructed by the bar 53 and the fixed levers 51 so that the upper rod portions 521 will be kept at its uplifted state to hold the hanger 31 of the pipe 3 and the cup 4 without falling down.

Figure 3B:
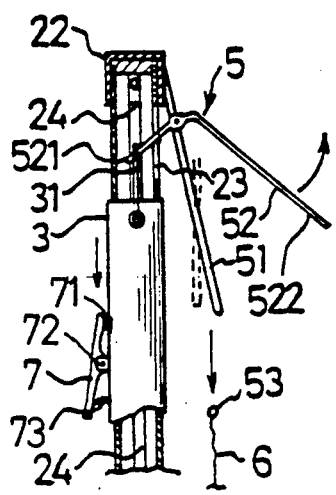
Figure 3C:
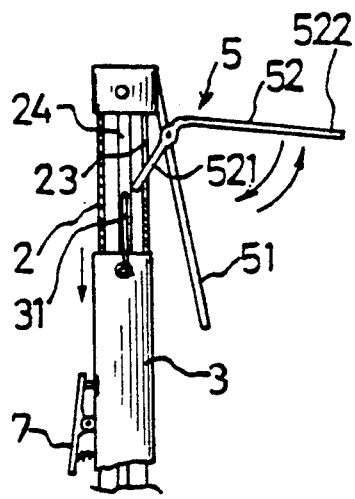

When the intruding animal is eating the bait 61 to pull the bait rope 6 to release the bar 53, the lever 52 will no longer by obstructed against the lever 51 and the upper rod portion 521 will be biased downwardly as shown in FIGS. 3b, 3c to release the hanger 31 so as to drop the pipe 3 and the cup 4 for catching the animal as shown in FIG. 2. The latch 71 as always resiliently poking into the pipe wall of pipe 3 will also engage the slot 21 to lock the pipe 3 with the pipe 2. At this time, the caught animal may try to escape by opening the cup 4. However, the catch 7 has its latch 71 locking the pipe 3 with the pipe 2 will prevent the lifting or opening of the cup 4. A lateral push on the cup will not open the cup since the lowest periphery 42 of the cup 4 is engaged with disk extension 11 of the base plate 1 for ensuring a complete locking of the cup and preventing the escape of the caught animal.

Figure 3D:
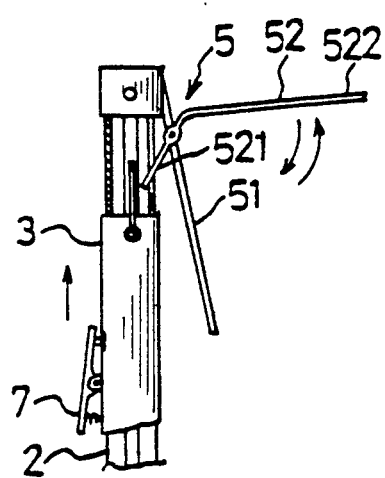
Figure 3E:
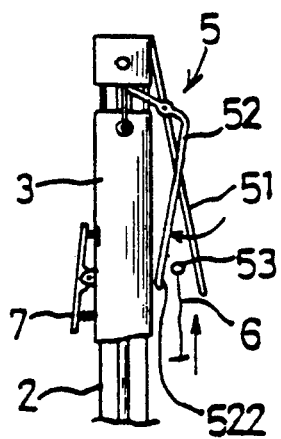
Figure 4:
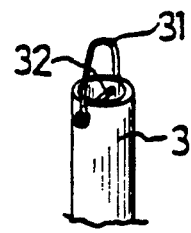
FIG. 4 is a perspective view showing an upper portion of an outer pipe of the present invention.

After catching the animal, the catch 7 may be depressed inwardly to unlock the latch 71 uncoupling the outer pipe 3 from the pipe 2, and the cup 4 is raised to allow the U-shaped hanger 31 of the pipe 3 to be hanged on the upper rod portion 521 of the biasing lever 52. When poking the rod portion 521 into the U-shaped hanger 31, the lower rod portion 522 can be lifted to its highest position as shown in FIG. 3d. After hanging the hanger 31 of the pipe 3, the lower rod portion 522 should be depressed inwardly as arrow direction shown in FIG. 3e and insert the horizontal bar 53 with the bait rope 6 to be clamped by the two levers 52, 51 as shown in FIGS. 3a and 1, ready for next catching operation.

The present invention has the following advantages superior to a conventional mouse trap:

1. It is shaped like a lampshade especially made as transparent cup which is not alert to a wise animal, thereby serving an an efficient trap for catching an alive animal.

2. The cup 4 will gravitational drop to catch the animal therein without damaging or breaking the caught animal, causing no contamination problem such as blood or shredded tissue from an animal.

3. Besides the function for catching animals in land such as mouse and animals in air like bird, it may serve as an interesting trap for catching fish or aquatic animals in the water.

4. Simple construction, easy operation and minor maintenance problem are further merits of this invention.

I claim:

1. An animal trap comprising:
   a vertical supporting pipe having a base plate formed on a bottom portion of said supporting pipe;
   a catching cup secured with an outer pipe thereon movably jacketed on said supporting pipe; and
   a trigger means formed on an upper portion of said supporting pipe having a bait rope of which a bait is mounted on a lower end of said bait rope, said trigger means normally hanging said outer pipe said catching cup on an upper portion of said supporting pipe, said trigger means including: a pair of fixed levers inclinedly secured to an upper portion of said supporting pipe, a biasing lever pivotally secured to said fixed levers having an upper rod portion of said biasing lever operatively hanging a U-shaped hanger formed on an upper portion of said outer pipe and a lower rod portion protruding downwardly outwardly to operatively form an acute angle with said fixed levers, and a horizontal bar secured with an upper portion of said bait rope, said horizontal bar being clamped between said fixed levers and said biasing lever within said acute angle defined by said lower rod portion of said biasing lever and said fixed levers, whereby upon a taking of the bait to release the rope and the horizontal bar, the biasing lever will not be obstructed on the fixed levers and still be biased to downwardly move the upper rod portion to drop the outer pipe and the cup for catching an animal.

2. An animal trap according to claim 1, wherein said upper rod portion and said lower rod portion of said biasing lever define an obtuse angle therebetween, said lower rod portion being generally longer than said upper rod portion.

3. An animal trap according to claim 1, wherein said fixed levers form an acute angle between the fixed levers and said vertical supporting pipe.

4. An animal trap according to claim 1, wherein said U-shaped hanger of said outer pipe is slidably moved in a pair of longitudinal slots symmetrically formed in an upper portion of said supporting pipe.

5. An animal trap according to claim 1, wherein said upper rod portion of said biasing lever operatively pokes into the supporting pipe through an upper notch formed in an upper portion of said supporting pipe.

* * * * *